United States Patent [19]

Pearson

[11] Patent Number: 4,504,556
[45] Date of Patent: Mar. 12, 1985

[54] MULTICELL ELECTRIC STORAGE BATTERIES

[75] Inventor: Ernest J. Pearson, Manchester, England

[73] Assignee: Chloride Group Public Limited Company, London, England

[21] Appl. No.: 547,227

[22] Filed: Oct. 31, 1983

[30] Foreign Application Priority Data

Oct. 29, 1982 [GB] United Kingdom ............... 8230957
Jul. 14, 1983 [GB] United Kingdom ............... 8319050

[51] Int. Cl.³ .......................................... H01M 10/04
[52] U.S. Cl. .................................. 429/136; 429/149; 429/160; 429/210; 429/242
[58] Field of Search ............... 429/149, 152, 160, 210, 429/57, 242, 136

[56] References Cited

U.S. PATENT DOCUMENTS

| | | | |
|---|---|---|---|
| 759,058 | 5/1904 | Apple | 429/149 |
| 3,941,615 | 3/1976 | McDowall | 429/149 |
| 4,209,575 | 6/1980 | McDowall et al. | 429/146 |
| 4,331,747 | 5/1982 | Julian et al. | 429/160 |
| 4,383,011 | 5/1983 | McClelland et al. | 429/149 X |
| 4,425,412 | 1/1984 | Dittmann et al. | 429/152 X |

FOREIGN PATENT DOCUMENTS 1430205 3/1976 United Kingdom .
2070844 9/1981 United Kingdom .

*Primary Examiner*—Anthony Skapars
*Attorney, Agent, or Firm*—Finnegan, Henderson, Farabow, Garrett & Dunner

[57] ABSTRACT

A lead acid battery comprises two spaced parallel rows of cells connected in parallel, one plate in each cell lying in the same plane as one plate in every other cell. Every alternate plate in the two electrical end cells is a unipolar plate connected to a terminal pillar while every remaining plate is one half of a bipolar pair of plates connected to its other half in an adjacent cell, preferably in the other line of cells, by an integral bridge piece.

47 Claims, 10 Drawing Figures

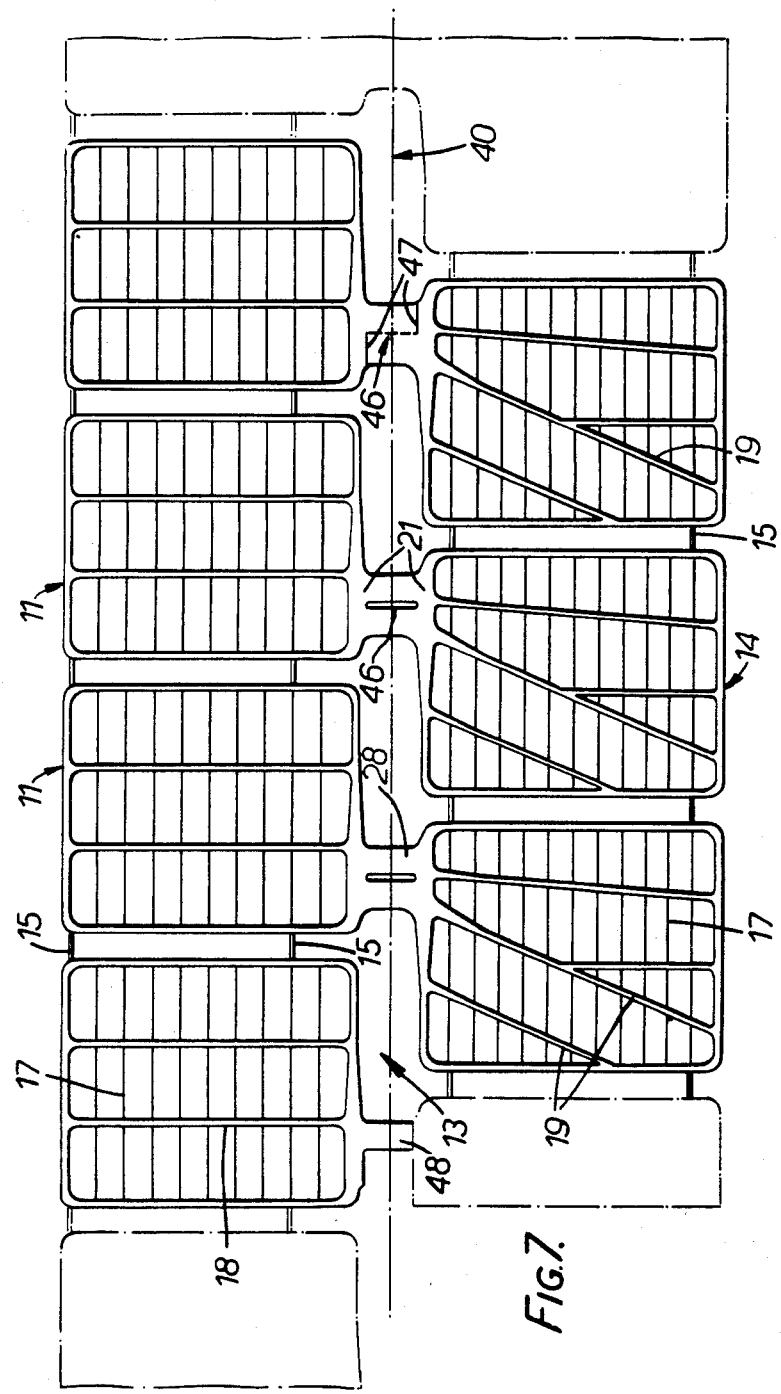

MULTICELL ELECTRIC STORAGE BATTERIES

The present invention relates to multicell electric storage batteries, particularly of the type containing substantially no mobile electrolyte, e.g. batteries in which the electrolyte is in gel form or recombination batteries in which substantially all the electrolyte is absorbed in the plates and separators. The invention is concerned in particular with such batteries of lead acid type. Recombination batteries are those which contain a reduced amount of electrolyte such that substantially all the electrolyte is absorbed in the plates and separators and in which the gas evolved within them during operation or charging is not normally vented to the atmosphere but is induced to recombine within the battery.

Conventional lead acid batteries include a plurality of cells containing alternating positive and negative plates each of which has an upstanding plate lug. The cells are electrically connected but electrolytically isolated by intercell partitions which are integral with the container and which are sealed to the lid and the plates of each polarity in each cell are connected together by a respective plate strap and plate straps of opposite polarity in adjacent cells are connected together by an intercell connector. The steps of forming the plate straps and forming the intercell connectors are frequently combined, but nevertheless this is a time consuming and thus expensive operation which requires a substantial amount of lead or lead alloy. The electrical paths through the plate straps and intercell connectors are relatively long with the result that the battery has an appreciable internal resistance. Furthermore the grids which act as carriers for the active material of the plates and thus the plates themselves are made relatively thick so as to exhibit the rigidity which is essential if the plates are to withstand the forces to which they are subject during the assembly of the battery. This thickness of the plates results in their including more lead than is necessary as regards electrochemical requirements and a utilisation of the active material which is substantially less than the theoretical maximum.

It is highly desirable to minimise the amount of lead or lead alloy used in the plates and in the plate straps and intercell connectors and, if possible, to eliminate the steps of forming the plate straps and intercell connectors all together. It is also desirable that the intercell current paths should be as short as possible thereby reducing the internal resistance of the battery and thus increasing its maximum output current and thus its cranking power in the case of an automotive battery. British patent specification No. 2070844 of the present applicants discloses a multicell electric storage battery of recombination type in which every alternate electrode in the two end cells is a unipolar plate whilst all the remaining electrodes are one half of a bipolar plate which is connected to its other half in an adjacent cell by a bridge piece which passes around one side of the intercell partitions separating the two cells. Each electrode is therefore integrally connected to an electrode of the opposite polarity in an adjacent cell by a bridge piece and there is thus no need to form separate plate straps or intercell connectors.

In addition, the intercell current paths are of minimum length and the battery thus has a very low internal resistance.

Whilst the battery disclosed in this prior specification is very advantageous as regards its low internal resistance and the elimination of the steps of forming plate straps and intercell connectors, it is somewhat complex to assemble since the assembly is a manual operation in which the electrodes are inserted successively into the container.

Accordingly it is an object of the present invention to provide a multicell electric storage battery, particularly of recombination type, which has all the advantages of the battery disclosed in the specification referred to above but which may be assembled very much more easily and has advantageous electrical and electrochemical characteristics.

According to a first aspect of the present invention there is provided a multicell electric storage battery in which each cell comprises a stack of positive and negative battery plates interleaved with separator material, each plate being substantially in a common plane with a plate in every other cell, each pair of adjacent cells affording respective opposed surfaces, not all of which opposed surfaces are parallel. Preferably all the plates are disposed adjacent a hypothetical median line in the respective common plane with some on one side and some on the other side of the median line. The plates in each common plane are preferably disposed in two lines, one on each side of the respective median line. The preferred embodiment includes bridge pieces, which may all extend across the median line, interconnecting pairs of plates of opposite polarity, each pair of such connected plates and the associated bridge piece constituting a bipolar pair of plates. The bridge pieces are preferably integral and substantially coplanar with the plates they interconnect and thus each plate, with the exception of every alternate plate in the two electrical end cells, is preferably one half of a bipolar pair of plates with plates of opposite polarities on opposite sides of the respective median line.

The median lines of all the common planes preferably lie in a further common plane perpendicular to the said common planes. The battery preferably comprises two lines of cells extending parallel to the median lines and in each common plane there is preferably a line of positive plates on one side of the respective median line and a line of negative plates on the other side.

According to a further aspect of the present invention an electric storage battery of the type containing substantially no mobile electrolyte comprises two lines of battery cells side by side within a sealed outer container, all the intercell connections extending between the lines.

According to a further aspect of the present invention a multicell electric storage battery includes a plurality of cells electrically connected in series, the cells being arranged in two lines and adjacent cells in each line being electrolytically isolated from one another, each cell comprising alternating positive and negative plates interleaved with separator material, every alternate plate in each of the two end cells being a unipolar plate and the remaining plates each being one half of a bipolar plate connected to its other half in a different cell and the two halves of each bipolar pair of plates lying substantially in a single plane and being connected by an integral bridge piece. In the preferred embodiment adjacent pairs of cells in each line are separated by a substantially planar intercell partition and each plate extends substantially perpendicular to the or each intercell partition separating it from the or each adjacent cell.

Thus in the battery in accordance with this aspect of the present invention, which preferably includes four or more cells, there are two spaced lines of cells and the plates in the cells are "horizontal", that is to say that in practice they extend substantially parallel to the lid rather than perpendicular to the lid as is conventional. The two lines of cells are not necessarily straight and thus the battery may be, for instance, of generally arcuate form but it is preferred that the two lines are both straight and parallel to one another.

The plates are conveniently all of rectangular shape but this is not essential and they may be of any desired shape. It is, however, very desirable that the area and also the shape of all the plates are the same.

The battery may be of flooded electrolyte type, in which case the separator may be of conventional type, i.e. microporous PVC. It is necessary to take great care in this construction to ensure that the cells are electrolytically sealed from one another. This may be somewhat problematic since the battery in accordance with the invention has two lines of cells connected in series by the bridge pieces. Adjacent cells which are not directly connected by the bridge pieces may be separated by providing intercell partitions, preferably integral with the bottom and two side walls of the container. These preferably extend approximately half way across the width of the container in the case in which the bridge pieces all extend between the two lines of cells, the partitions on the two sides of the container being of necessity offset from one another, e.g. by substantially half a pitch and sealed to the battery lid. Those cells which are not directly connected, e.g. the two lines of cells, may be sealed from each other by moulding a partition between the two lines to form a seal with the bridge pieces in situ in the container by pouring in a settable material, such as epoxy resin. Alternatively, an integral intercell partition may be provided with slots to accommodate the integral bridges which are subsequently sealed by e.g. epoxy resin or hot melt adhesive. In both cases the intercell partitions must also be sealed to the battery lid.

The present invention is however more applicable to batteries of the type containing substantially no mobile electrolyte, e.g. of recombination type. In this latter event, the electrolyte is present in the cells in a reduced amount, that is to say an amount such that there is substantially no free unabsorbed electrolyte, and the separator material is compressible fibrous and absorbent, preferably microfine glass fibre material. In this event, it is still highly desirable that cells which are adjacent but not directly connected be separated by an intercell partition since otherwise the separator material of one cell might contact that of an adjacent cell thus providing an intercell ionic leakage path. These intercell partitions need not be fixed within the container and may thus be constituted by the material of plastics bags within which each cell is accommodated or alternatively by in situ moulded partitions, e.g. of hot melt adhesive. However, in the preferred form of the invention in which all the bridge pieces extend between the two lines of cells the container is of substantially rectangular section with one or more intercell partitions integral with each side wall, the intercell partitions extending substantially only to the centre of the container and being offset from the intercell partitions on the other side of the container. In any event, it is not essential in this construction that the cells be completely sealed from each other and thus the intercell partitions need not be sealed to the lid since in batteries of this type with substantially no mobile electrolyte there is believed to be no, or at least a substantially diminished, risk of intercell ionic leakage currents occurring.

Whilst it is highly desirable that cells which are adjacent but not directly connected be separated by an intercell partition, either integral with the container or constituted by the material of the plastics bags in which the cell elements are accommodated, since otherwise the separator material between adjacent plates might contact the separator material of the adjacent cell thus providing an intercell ionic leakage path, it is believed that an intercell partition between those cells which are adjacent but directly connected by an intercell connector which thus spaces the cells apart is not necessary since the space between them may be sufficiently large that the separator material of the two lines does not come into contact. By virtue of the fact that there is substantially no free or mobile electrolyte in the battery for the conduction of intercell ionic leakage currents it is believed that the presence of the space between the cells is sufficient to prevent leakage currents between them. It has previously been suggested that the surface of intercell connectors, constituted in this case by the bridge pieces, may in time become pitted and porous and thus constitute a pathway for intercell leakage currents. It is now believed that this does in fact not constitute a problem and the intercell connectors constituted by the bridge pieces therefore preferably extend across an air gap between pairs of cells with no partition or intercell sealing between them but the problem, if any, can be reduced by inclining the two halves of each bipolar plate to one another by a small angle. This may be achieved by providing a ramp formation under each line of cells inclined upwardly and towards the centre of the container so that the plates are positioned in an arched configuration. This will have the result of increasing the length of the bridge pieces and thus the length of any intercell leakage current pathways. The references in this specification to "substantially coplanar" and "being substantially in a common plane" are to be interpreted accordingly and one or both halves of a bipolar plate may be rotated with respect to its bridge piece about an axis parallel to one or both of the length and breadth of the bridge piece. It will be appreciated that what is of primary importance is that each half of the bipolar pairs of plates extend in a direction generally parallel to that in which the associated bridge piece extends.

Alternatively, however, those pairs of cells which are directly connected may be electrolytically isolated from one another by an electrolyte impermeable barrier which then forms an electrolyte seal with the bridge pieces. Such a barrier may be formed by pouring a fluid resin or plastics material into the space between the two lines of cells which subsequently solidifies.

Each cell, with the exception of the two electrical end cells, is electrically connected to two adjacent cells. In the case in which each cell is electrically connected to two cells in the other line of cells, the two lines are preferably offset in the direction of their length. This is convenient as regards the physical arrangement of the intercell connectors and permits all the plates in each plane, in each line to be of a single polarity which facilitates the application of active material. In the case in which the cells of the two lines are not offset the plates in the same line in each plane will have to be of differing polarity which necessitates the use of a universal active material or the separate pasting with differing active material of plates in the same line. If the container is rectangular, as is conventional and if the bridge pieces extend parallel to the end walls of the container and the two lines of cells are offset this will inevitably mean that there is a small amount of space wasted at one end of one line of cells and at the other end of the other line of cells. This space can accommodate the terminal pillars of the battery or it can merely be left empty or filled with a packing piece of e.g. plastics foam material. In an alternative construction the bridge pieces do not extend perpendicular to the direction in which the lines of cells extend but at an acute angle to this direction. This enables the space wasted in a rectangular container to be minimized.

Each side surface, i.e. cut surface, of each cell may be engaged by a respective protective member, e.g. of separator material, engaging the free edge of each plate and providing a barrier to lead growths thereby protecting the battery from internal short circuits. The bridge pieces may be formed with an aperture dividing them into two portions extending side by side, the function of which aperture will be described below.

Each bipolar pair of plates may be connected by a single bridge piece or by two or more spaced bridge pieces. The latter alternative more positively restrains the two halves of the bipolar pairs of plates and thus the cells of which they form part against relative movement or rotation which could potentially ultimately result in two cells contacting thereby internally short circuiting the battery.

Further features and details of the present invention will be apparent from the following description of certain specific embodiments which is given by way of example only with reference to the accompanying drawings, in which:

FIG. 7 is a plan view of a single cast electrode member or plate array for use in the assembly of an alternative construction of battery in accordance with the invention;

Figure 1:
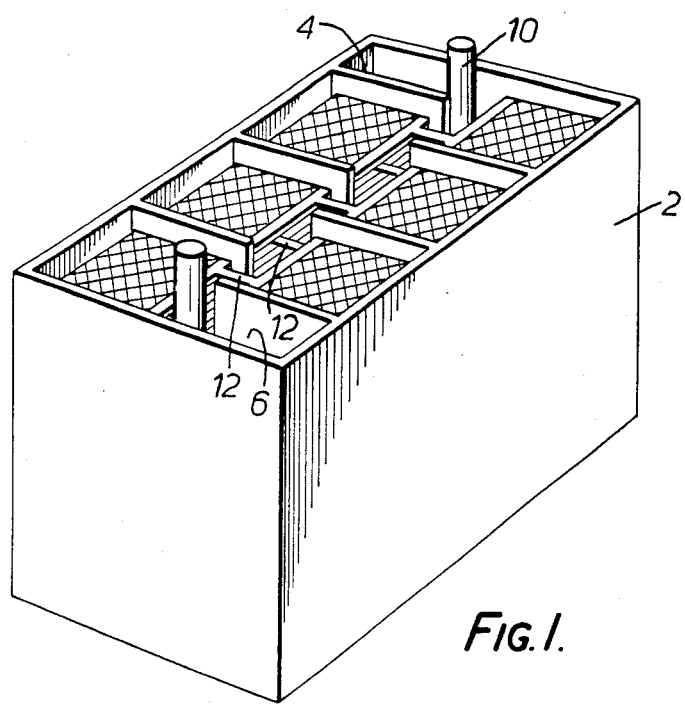
FIG. 1 is a perspective view of a 12 volt lead acid automotive battery of recombination type from which the lid has been omitted for the sake of clarity.
Figure 2:
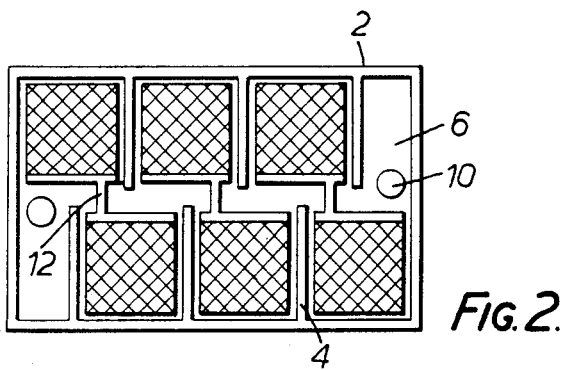
FIG. 2 is a plan view of the battery of FIG. 1 showing only the top layer of plates.
Figure 3:
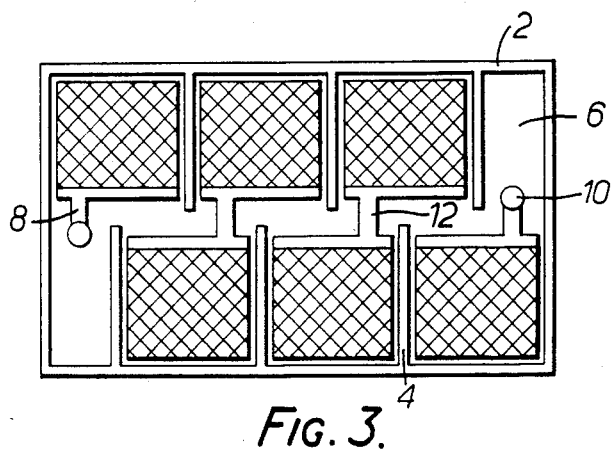
FIG. 3 is a view similar to FIG. 2 showing only the layer of plates below the top layer.

Referring first to FIGS. 1 to 3, the battery includes a rectangular section container 2 of polypropylene or like material integral with each of whose two longer sides are three intercell partitions 4. Each partition 4 extends substantially only to the longitudinal centre line of the container and the partitions on one side of the container are offset from those on the other side by a distance substantially equal to one half of the distance between adjacent partitions. The partitions divide the interior of the container into two lines of three equally sized compartments at one end of one of which is an empty space 6 and at the other end of the other of which is a similar empty space.

Each compartment defined by the intercell partitions contains a stack of planar horizontal alternating positive and negative plates interleaved with compressible fibrous absorbent separator material, which in this case comprises a sheet of microfine glass fibres. Every alternate plate in the two end cells, that is to say the left hand cell in the upper line and the right hand cell in the lower line as seen in FIGS. 2 and 3, constitutes a unipolar plate having a lug 8 projecting therefrom. The lugs 8 are thus disposed in two vertical stacks which are connected to respective positive and negative terminal pillars 10 which are situated in the spaces 6 and which project through the battery lid. The remaining plates in the two end cells and all the plates in the other cells each constitute one half of a bipolar pair of plates which is connected to its other half in a cell in the other line of cells by an integral bridge piece 12 which extends perpendicular to the direction of the length of the lines of cells.

Each cell is defined by four vertical substantially planar surfaces, at least two of which are spaced from and opposed to a corresponding parallel surface of an adjacent cell. Certain of the pairs of opposed surfaces extend transverse to the length of the battery and the remainder are inclined thereto and extend parallel to the length of the battery Each cell contains an amount of electrolyte which is insufficent to saturate the electrodes and separator material and if gas is evolved during charging of the battery this is induced to recombine within the battery. The container is sealed by a lid (not shown) which is provided with a single safety vent with which each cell communicates and through which gas may be vented if it is evolved at a rate in excess of that at which it can be recombined. The lid, or pads (not shown) on the underside of the lid engage the tops of the cell elements thereby restraining them against vibration and minimising the volume of the space in which a potentially explosive gas mixture may accumulate. As may be seen in FIG. 2, there is an appreciable gap between each cell and the adjacent side wall of the container to permit the ready introduction of the electrolyte into the battery and/or to accommodate excess electrolyte at the time when the battery is subjected to its initial formation.

In a modified construction, which is not illustrated, the bridge pieces 12 extend at an acute angle to the direction in which the lines of cells extend. This permits the empty spaces 6 to be reduced in volume but does not permit these to be dispensed with altogether when the container is of rectangular section.

Figure 4:
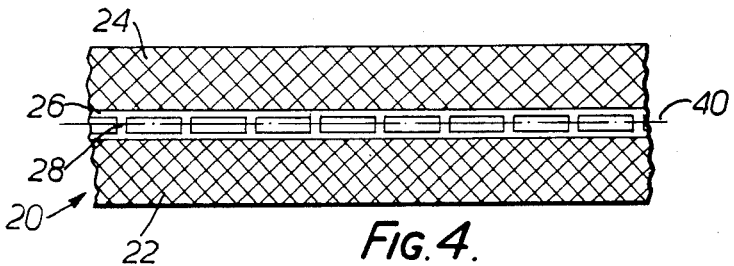
FIG. 4 is a plan view of a single expanded electrode member for use in the assembly of a battery in accordance with the invention.
Figure 5:
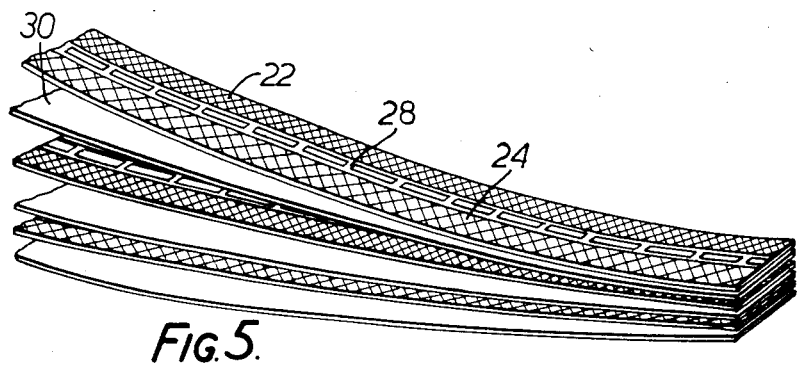
FIG. 5 illustrates diagrammatically the formation of the laminated structure of electrode members and separator material.

The battery in accordance with the invention may be manufactured by a method which will now be described with reference to FIGS. 4 to 6. A plurality of elongate or continuous electrode members or grid arrays 20, of which one is shown in FIG. 4, are formed comprising two continuous spaced grids 22 and 24 of lead or lead alloy each having a respective selvedge 26. Each grid array is substantially symmetrical about a median line 40. The selvedges are integrally connected at spaced intervals by bridge pieces 28. The grid arrays may be cast in a conventional casting machine but in this embodiment a strip of lead or lead alloy is continuously expanded in an expander machine leaving an unexpanded central land from which rectangular portions are subsequently removed to form apertures separated by the bridge pieces 28. The grids 22 and 24 are then pasted with positive and negative active material respectively or alternatively they are both pasted with the same universal active material, that is to say an active material which can be electrolytically formed into either positive or negative active material. The grid structure of the positive grid 22 is preferably smaller than that of the negative grid 24 since positive active material may require more physical support than negative active material. The meshes of the grids are preferably of decreasing cross-section with increasing distance away from the bridge pieces 28 to optimise the electrical performance of the battery per unit weight of lead utilised. A plurality of pasted grid arrays, which may now be regarded as plate arrays, are then overlaid to form a composite laminated structure, shown diagrammatically in FIG. 5, with an elongate strip of microfine glass fibre separator material 30 interleaved between each adjacent pair of elongate grids 22, 24. The plate arrays are superposed such that each active area of each plate array is adjacent to an active area of opposite polarity on the or each adjacent plate array. In addition, adjacent plate arrays are offset longitudinally by half a pitch with the result that the bridge pieces of each plate array are adjacent to the centres of the apertures defined by the bridge pieces of the or each adjacent plate array.

After formation of the laminated structure a plurality of cuts 32 is made in each side of it extending over its full height and into the central spaces defined by the bridge pieces 28. The cuts on each side of the laminated structure are spaced apart by a distance equal to the spacing of the bridge pieces of the plate arrays and the cuts on the two sides are offset longitudinally by half a pitch. The laminated structure is thereby separated into two continuous spaced lines of stacks of separate plates of alternating polarity of which every plate is connected to a plate of opposite polarity in a stack of plates in the other line by an integral bridge piece and thus constitutes one half of a bipolar pair of plates. The cuts may be formed in any suitable manner which does not deform the cut edges of the plates sufficiently far that they contact an adjacent plate in the same stack and it is found that this may be conveniently performed by means of a high speed band saw.

The two lines of stacks of plates are interconnected by the bridge pieces which are disposed in a plurality of stacks, the bridge pieces in each stack alternately connecting a positive plate in one stack in one line to a negative plate in a stack in the other line and a negative plate in the one line to a positive plate in the other line. Selected stacks of bridge pieces are then severed at their central point, for instance by means of the high speed band saw, to separate the laminated structure into battery elements It will be appreciated that the stacks of bridge pieces to be severed are selected in accordance with the number of cells to be possessed by the finished battery, and in the case of a six cell 12 volt battery every sixth stack of bridge pieces is severed. Each battery element thus has a stack of severed bridge pieces at each end and it will be appreciated that in the finished battery these are connected to the battery terminals. This latter operation may be performed in any convenient manner but in this embodiment the laminated structure is placed in a clamp for the severing operation and the bridge pieces of each of the two stacks of severed bridge pieces are connected together by forming a mould cavity around them whilst still in the clamp, for instance by means of a two part comb mould or by dipping them into a mould cavity into which molten lead or lead alloy is introduced. Each battery element is then placed into a battery container with integral intercell partitions as illustrated in FIGS. 1 to 3, for instance by lowering a battery container onto the battery element whilst it is supported on the bottom plate of the open clamp, or alternatively each stack of plates is placed within a respective plastics bag and the battery element then placed into a battery container having no fixed intercell partitions. It will be appreciated that in the assembled battery each stack of plates constitutes one cell and that each plate in the two end cells, that is to say the cells at the electrical end of the series-connected cells, whose bridge piece has been severed constitutes a unipolar plate and is connected to a terminal of the battery whilst all the remaining plates constitute one half of a bipolar pair of plates whose other half is in the other line of cells.

Electrolyte is added to the cells in any convenient manner either before or after the insertion of the battery element into the battery container in an amount insufficient to saturate the electrodes and separator material and after the sealing of a lid to the battery container the battery is then complete. The lid, or pads on the lid, exert a compressive force on all the cells thereby pressing the plates and separators into intimate contact which is believed to be necessary for efficient recombination operation. The formation of plate straps and intercell connectors is not required since each plate which constitutes one half of a bipolar pair of plates is connected to its other half by a bridge piece which constitutes an intercell connector and thus only terminal pillars need to be formed to connect together the two stacks of severed bridge pieces which pillars may extend through the lid or be subsequently connected to respective terminals projecting up from the battery lid.

In the method described above the battery is assembled from electrode members comprising two elongate expanded grids connected by spaced solid bridge pieces. Such electrode members are most conveniently made by expanding a metallic strip to leave an unexpanded central land from which portions are subsequently removed. This method is very wasteful of material and thus in an alternative method of assembly, which is not illustrated, each electrode member comprises an elongate metallic strip expanded over its entire area. The central portions removed from these strips are much shorter than in the case in which there is a central unexpanded land and the remaining bridge pieces preferably have a length of between ¼ and ½ of the pitch of the bridge pieces. The bridge pieces are thus themselves of expanded grid form but are found to perform their electrical function perfectly adequately. It will be appreciated that the wastage in this method is substantially reduced firstly because the removed portions are much smaller and secondly because the removed portions are expanded and not solid metal.

In the embodiments described above the electrode members or grid arrays and the plates of the finished battery comprise expanded metal and it will be appreciated that in this case the grids are not identifiable as such in the electrode members and after pasting but prior to cutting the individual plates also are not identifiable and only become identifiable once the cuts have been made and the pasted electrode members separated into individual stacks of plates. However, in a further embodiment, which will be described with reference to FIGS. 7 and 8, the plates are cut from a cast array of pasted interconnected grids comprising two lines of separately identifiable plates, the plates in each line being integrally connected by means of temporary links.

Referring now to FIG. 7, the battery grid array comprises a planar elongate strip of lead or lead alloy mesh which is continually cast on a casting machine generally of the type described in U.S. Pat. No. 4,349,067, a short length of which cast mesh is shown in FIG. 7. The casting is in the form of an array of grids arranged in two spaced parallel lines disposed on opposite sides of what may be termed a median line or line of symmetry 40. The grids 11 of one line are adapted to be formed into negative plates and are offset by half a pitch from the grids 14 of the other line which are adapted to be formed into positive plates. The two lines are separated by a gap 13 but each negative grid is integrally connected to a positive grid by a bridge piece or lug 28 which crosses the gap. The pitch of the lugs 28 is thus equal to the pitch of the grids in the two lines. The grids of each line are spaced apart but interconnected by integral temporary links 15 which give the cast elongate strip some stability but which are severed during assembly of the battery. Each grid is formed with bars 17 extending parallel to the length of the array which are closer spaced in the positive grids than in the negative grids. The negative grids also include bars 18 extending transverse to the length of the array whilst the positive grids include bars 19 generally radiating from the lugs 28. The grid frames are broadened adjacent their point of connection to the lugs 28, as indicated at 21. In general, the bars in the positive grids are wider than those in the negative grids and the thickness of the grids for a typical automotive battery is about one millimeter, or less. After casting, the strip is pasted, that is to say active material is applied to the grids. Thus positive and negative active material is applied to the lines of positive and negative grids respectively in any conventional manner.

Batteries are assembled from such pasted grid arrays, i.e. from plate arrays, by forming a laminated structure and then forming cuts in a manner similar to that described above. However, in this embodiment, the laminated structure is not continuous but each grid array is cut to the desired length prior to forming the laminated structure thereby avoiding the necessity of severing stacks of bridge pieces.

In one specific method of battery assembly a strip comprising 144 interconnecting grids of the form shown in FIG. 7 is cast, the two lines of grids are pasted with positive and negative active material respectively and a strip of separator material is then laid on each row of pasted grids, that is to say plates, and optionally lightly secured thereto. The strip is then severed into 24 arrays of 6 plates each by severing appropriate links 15 and bridge pieces 28 and the separator material overlying the links to be severed. A 24 layer laminated structure is then built up and it will be appreciated that this will necessitate the turning of every alternate plate array through 180° to permit the desired registry of plates of alternating polarity to be achieved.

When the laminated structure is separated into individual cell packs a total of four cuts is all that is required, each severing a temporary link 15 in each of the 24 layers. It will be appreciated that the unipolar plates in the two end cells, that is to say the cell at one end of one row and the other end of the other row, has a bridge piece which was severed prior to the formation of the laminated structure and thus terminates short of the other row.

Figure 6:
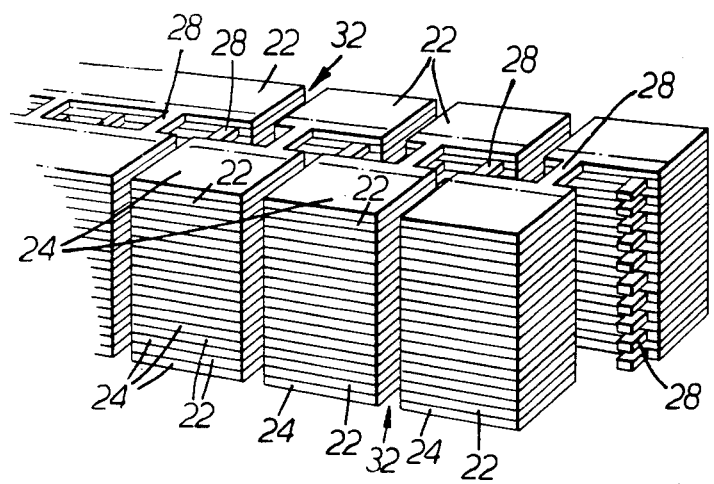
FIG. 6 shows the laminated structure after the cuts have been made in the two sides.

The resultant laminated structure is similar to that shown diagrammatically in the right hand half of FIG. 6. As in the previous embodiments the laminated structure may be many layers thick and the precise number of layers will be related to the desired current capacity of the battery. In the first, third, fifth, etc. layers of the laminated structure the negative plates are on one side and in the second, fourth, etc. layers the negative plates are on the other side of the laminated structure.

As may be seen in FIG. 7, each bridge piece 28 is separated into two by a central gap 46 extending parallel to its length, i.e. transverse to the length of the rows. When the continuously cast strip is separated into individual grid arrays every sixth bridge piece is severed also and this is done by forming two cuts 47 which communicate with the gap 46 to leave two full length but half width terminal connectors, designated 48 in FIG. 7.

After the laminated structure has been built up from individual plate arrays it is clamped, as before, to facilitate its separation into individual cell packs by severing the links 15. The connectors 48 are disposed in two vertical stacks and a tapered terminal pillar 57 is then formed around each such stack, preferably by pouring molten lead into a mould placed around the stack. The cross section of the terminal posts 57 increases such that at their take-off end the cross-section is equal to the aggregate cross-section of each of the stacks of bridge pieces 28, which of course constitute the intercell connectors in the finished battery. The terminal pillars are positioned as close as possible to the inner faces of the grids to minimise the internal resistance of the battery.

Figure 8:
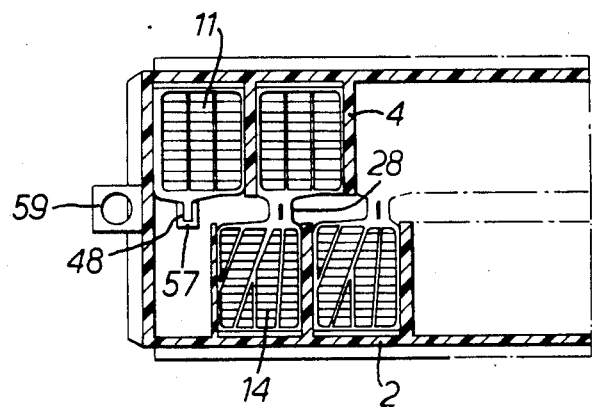
FIG. 8 is a view similar to FIG. 2 showing a battery assembled from cast plate arrays.

The severed structure is then placed as a unit into an outer container 2, seen in FIG. 8, of similar construction to that shown in FIG. 2. The battery is then filled with electrolyte and either before or after the addition of the electrolyte side terminal connectors 59 on the container are connected to the terminal posts 57 by resistance welding or the like. The battery is then electrolytically formed and the container sealed by a lid.

Figure 9:
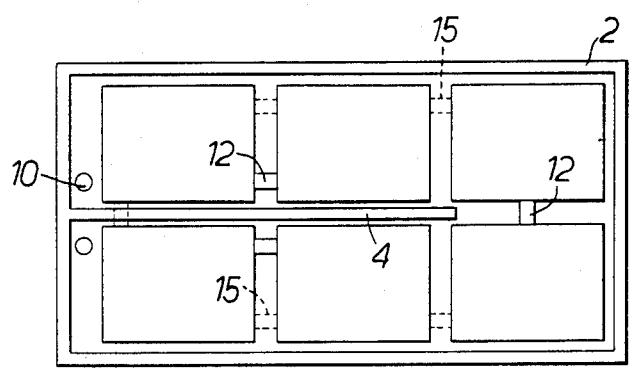
FIGS. 9 and 10 are views similar to FIGS. 2 and 3 respectively showing a modified construction of battery incorporating cast plate arrays.
Figure 10:
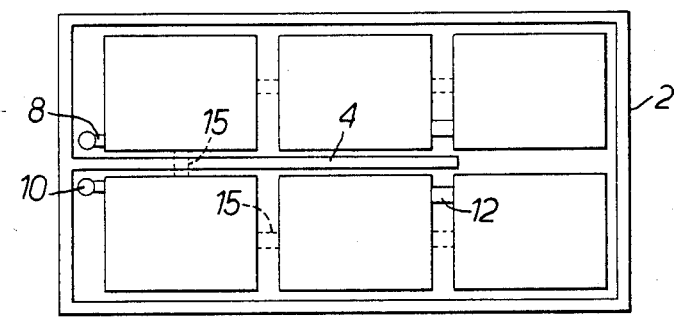

In the modified construction of 12 volt automotive battery illustrated diagrammatically in FIGS. 9 and 10 only one intercell connector, constituted by a stack of bridge pieces 12, extends between the two lines of cells and the other four such connectors extend in the direction of the length of the lines, two being situated in each line. This avoids the necessity of offsetting the two lines of cells and the six cells thus have together a substantially rectangular shape in plan. In addition, the polarity of the plates in each line in each planar plate array is not the same, as is the case in the previous embodiments, but alternates in each line. Those pairs of cells which are directly connected by an intercell connector are maintained spaced apart only by the bridge pieces constituting the intercell connector whilst those cells which are adjacent but not directly connected, namely the left hand two cells in the upper and lower lines of cells as seen in FIGS. 9 and 10, are separated by an intercell partition 4 integral with the container 2.

Such a battery is assembled by casting a plurality of two types of grid array shown in FIGS. 9 and 10 respectively in which the grids are connected by integral bridge pieces and also by integral temporary links 15, which are shown in dotted lines. The grid arrays are then all pasted with a universal active material or alternatively each grid is individually pasted with an active material which is specific to the polarity which it is to adopt in the finished battery. A laminated structure is then built up with the two types of plate array alternating and with each plate separated from the or each adjacent plate with which it is in registry by a strip of separator material. A total of six cuts are then made in the laminated structure to sever the temporary links 15 whilst leaving the bridge pieces 12. The battery is then completed as described above in connection with the previous embodiments.

The term "batteries of the type containing substantially no mobile electrolyte" does not exclude the possibility that a small amount of free electrolyte may be present, at least at certain times. Thus after electrolytic formation there may be a small amount of free electrolyte present in a recombination battery but this will simply be electrolysed off once the battery is put into service thereby bringing the battery into a full recombination mode. Similarly, when a recombination battery is very deeply discharged a small amount of free water may be produced but this is reabsorbed when the battery is charged again.

Typical compositions for the positive and negative active material pastes are given in the table below:

|  | Positive | Negative |
| --- | --- | --- |
| Grey Oxide (PbO) (Lilograms) | 13.62 | 13.62 |
| Barium sulphate (grams) | — | 68 |
| Carbon black (grams) | — | 23 |
| Lead Stearate (grams) | — | 7 |
| Lignosulphonate sold under the Trade Mark VANISPERSE (grams) | — | 45 |
| Polyester fibre (3 mm) (grams) | 11.5 | 11.5 |
| Water (liters) | 1.68 | 1.53 |
| $H_2SO_4$ (1.4 specific gravity) (liters) | 1.02 | 0.87 |

The sulphuric acid electrolyte added to the battery typically has a specific gravity of 1.24 and is added in an amount of 0.417 liters per kilogram of total active material in the battery.

The battery makes very economical use of lead because all the lead used during casting is included in the finished battery except form the small amount of lead forming the temporary interconnecting links.

In view of the fact that the plates in the finished battery are "horizontal" and may be retained horizontal at all times during assembly of the battery the plates may be designed primarily for electrochemical efficiency since mechanical strength and in particular bending rigidity is not an important requirement. This enables the plates to be substantially thinner than in a conventional battery which results in a more efficient utilisation of active material and the need for less metallic lead in the battery. This fact coupled with the fact that the intercell connections are integral and necessarily of the minimum theoretical length results in the peak current which the battery may produce being very high, which capability may result in the case of an automotive battery in the battery having a reduced weight and thus reserve capacity for a given cranking power which is a function of the peak current.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A multicell electric storage battery comprising a plurality of cells, each cell comprising a stack of alternating positive and negative battery plates interleaved with separator material, each plate in each cell being substantially in a common plane with a plate in every other cell and each plate being disposed adjacent a hypothetical median line in the respective common plane with some plates on one side and some on the other side of the median line.

2. The battery of claim 1 in which the plates in each common plane are in two lines, one line on each side of the median line.

3. The battery of claim 1 including bridge pieces interconnecting pairs of positive and negative plates, each pair of such connected plates and the associated bridge piece constituting a bipolar pair of plates.

4. The battery of claim 3 in which the bridge pieces are both integral and substantially coplanar with the plates they interconnect.

5. The battery of claim 3 in which all the bridge pieces extend across the respective median line.

6. The battery of claim 3 in which those pairs of plates that are directly connected by a bridge piece are not physically separated by a partition.

7. The battery of claim 1 in which the median lines of all the common planes lie in a further common plane perpendicular to the said common planes.

8. The battery of claim 1 in which the cells are electrically connected in series and two of the cells constitute electrical end cells and in which each plate, with the exception of every alternate plate in the stack of plates in the two electrical end cells, is one half of a bipolar pair of plates with one plate of each pair being on one side of the respective median line and one on the other side.

9. The battery of claim 8 in which in each common plane there is a line of positive plates on one side of the median line and a line of negative plate on the other side.

10. The battery of claim 8 in which the stacks of plates form two lines of cells that extend parallel to the median lines.

11. The battery of claim 10 in which the cells in each line of cells are offset with respect to those in the other line in the direction of the length of the lines.

12. The battery of claim 11 including a terminal pillar accommodated in the space at each end of the line of cells provided by the offset of the cells in the two lines.

13. The battery of claim 11 in which the cells are accommodated within a container which is of substantially rectangular section having two sidewalls and two end walls with one or more intercell partitions integral with each sidewall and separating adjacent cells, the intercell partitions extending substantially only to the center of the container and being offset from the intercell partitions on the other side of the container.

14. The battery of claim 1 in which each plate includes a grid carrying electrochemically active material.

15. The battery of claim 14 in which the grid is expanded metallic grid.

16. The battery of claim 14 in which the grid is a cast grid.

17. The battery of claim 1 in which the plates and separator material of each cell are accommodated within a respective plastic bag.

18. The battery of claim 1 which contains substantially no mobile electrolyte, the separator material between the plates being capable of absorbing electrolyte in an amount sufficient to provide an electrical connection between adjacent plates of opposite polarity.

19. An electric storage battery which contains substantially no mobile electrolyte and comprises a plurality of cells, each cell comprising a stack of alternating positive and negative battery plates interleaved with separator material, the separator material being capable of absorbing electrolyte in an amount sufficient to provide an electrical connection between adjacent plates of opposite polarity, the cells being arranged in two lines side-by-side within a sealed container and being electrically connected in series with all the intercell connections extending between the two lines.

20. A multicell electric storage battery comprising a plurality of cells, including two electrical end cells, electrically connected in series, the cells being arranged in two lines with all cells being electrolytically isolated from one another, each cell comprising a stack of alternating positive and negative plates interleaved with separator material, every alternate plate in each of the two electrical end cells being a unipolar plate and each of the remaining plates being one half of a bipolar pair of plates, the two plates of each bipolar pair of plates being in different cells, being electrically connected, and lying substantially in a common plane.

21. The battery of claim 20 in which the plates of each bipolar pair of plates are connected with a bridge piece integral with the plates.

22. The battery of claim 21 in which those pairs of plates that are directly connected by a briege piece are not physically separated by a partition.

23. The battery of claim 20 in which adjacent cells in each line are separated by a respective substantially planar intercell partition and in which each plate in each cell extends substantially perpendicular to the adjacent intercell partition.

24. The battery of claim 20 in which the cells in each line of cells are offset with respect to those in the other line in the direction of the length of the lines.

25. The battery of claim 24 including a terminal pillar accommodated in the space at each end of the line of cells provided by the offset of the cells in the two lines.

26. The battery of claim 24 in which the cells are accommodated within a container which is of substantially rectangular section and has two sidewalls and two end walls with one or more intercell partitions integral with each sidewall and separating adjacent cells, the intercell partitions extending substantially only to the center of the container and being offset from the intercell partitions on the other side of the container.

27. The battery of claim 20 in which the plates and separator material of each cell are accommodated within a respective plastic bag.

28. The battery of claim 20 in which each plate includes a grid carrying electrochemically active material.

29. The battery of claim 28 in which the grid is an expanded metallic grid.

30. The battery of claim 28 in which the grid is a cast grid.

31. The battery of claim 20 which contains substantially no mobile electrolyte, the separator material between the plates being capable of absorbing electrolyte in an amount sufficient to provide an electrical connection between adjacent plates of opposite polarity.

32. The battery of claim 1 comprising six cells.

33. The battery of claim 20, comprising six cells, including the two electrical end cells.

34. A multicell electric storage battery comprising a plurality of cells electrically connected in series, each cell comprising a stack of alternating positive and negative battery plates interleafed with separator material with each plate in each cell being substantially in a common plane with a plate in every other cell, said cells forming at least two lines of cells with each line containing at least two cells and with all the plates in any one line in the same plane being of one polarity and all the plates in an adjacent line in the same plane being of opposite polarity.

35. A multicell electric storage battery comprising a plurality of cells electrically connected in series, said cells including two electrical end cells and each cell comprising a stack of alternating positive and negative plates interleafed with separator material with each plate in each cell being substantially in a common plane with a plate in every other cell, said cells forming at least two lines of cells with each line containing at least two cells, every alternate plate in each of the two electrical end cells being a unipolar plate and each of the remaining plates in all the cells being one-half of a bipolar pair of plates, the two plates of each bipolar pair being in different cells and in different lines of cells and being electrically connected, with all the plates in any one line in the same plane being of one polarity and all the plates in an adjacent line in the same plane being of opposite polarity.

36. The battery of claim 35 which contains substantially no mobile electrolyte, the separator material between the plates being capable of absorbing electrolyte in an amount sufficient to provide an electrical connection between adjacent plates of opposite polarity in a cell.

37. The battery of claim 35 wherein the separator material is fibrous, compressible and resistent to the electrolyte.

38. The battery of claim 37 wherein the separator material is a microfine glass fiber material.

39. The battery of claim 35 having two lines of cells.

40. The battery of claim 35 comprising six cells, including the two electrical end cells.

41. The battery of claim 35 including bridge pieces interconnecting pairs of positive and negative plates, each pair of such connected plates and associated bridge piece constituting a bipolar pair of plates.

42. The battery of claim 41 in which the bridge pieces are both integral and substantially coplanar with the plates they interconnect.

43. The battery of claim 41 in which those pairs of plates that are directly connected by a bridge piece are not physically separated by a partition.

44. The battery of claim 35 in which each plate includes a grid carrying electrochemically active material.

45. The battery of claim 44 in which the grid is an expanded metallic grid.

46. The battery of claim 44 in which the grid is a cast grid.

47. The battery of claim 35 in which the plates and separate material of each cell are accommodated within a respective plastic bag.

* * * * *